United States Patent Office 3,507,900
Patented Apr. 21, 1970

3,507,900
PROCESS FOR PREPARING ORGANIC ISOCYANATES
Emmett H. Burk, Jr., Glenwood, Ill., and Donald D. Carlos, Crown Point, Ind., assignors to Sinclair Research, Inc., New York, N.Y., a corporation of Delaware
No Drawing. Continuation-in-part of applications Ser. No. 502,346, Ser. No. 502,464, Ser. No. 502,616, Ser. No. 502,619, and Ser. No. 502,620, all of Oct. 22, 1965. This application Mar. 18, 1968, Ser. No. 714,004
Int. Cl. C07c 119/04, 85/44; C07d 83/08
U.S. Cl. 260—453          16 Claims

ABSTRACT OF THE DISCLOSURE

A process of preparing organic isocyanates is disclosed; the process involves decomposing at elevated temperatures, preferably in the presence of an inert solvent, a cyclic nitrile carbonate compound having the structure:

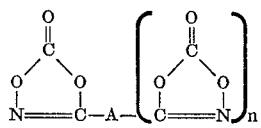

wherein $n$ has a value from 0 to 3 and A is aromatic or aliphatic (including cycloaliphatic) hydrocarbon.

---

This application is a continuation-in-part of copending applications Ser. Nos. 502,346; 502,464; 502,616; 502,619 and 502,620, filed Oct. 22, 1965, and later abandoned.

The present invention is directed to a process for the production of organic isocyanates. More specifically, the invention is directed to the production of organic isocyanates by the decomposition at elevated temperatures of cyclic nitrile carbonate compounds, i.e., compounds having the substituent

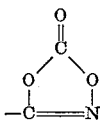

Organic isocyanates, including mono- as well as poly-, and aliphatic as well as aromatic, isocyanates, have found extensive use in the chemical industry. Polyisocyanates, for example, and particularly the diisocyanates, are used in the preparation of high molecular weight polymers by reaction of the polyisocyanates with polymerizable organic compounds such as compounds having terminal, active hydroxy and amine groups. Polyurethanes, for example, are commonly prepared by the reaction of diisocyanates and polyhydric alcohols such as the glycols. Monoisocyanates, on the other hand, find utility, for instance, as water-proofing and hydrophobizing agents for textiles, as solubilizing agents for cellulose acetate, etc. Several of the various known uses for organic isocyanates are disclosed, for example, in Chapter XIII of the book by Saunders and Frisch, entitled "Polyurethane: Chemistry and Technology, Part II" (Interscience Publishers (1964)).

The cyclic nitrile carbonate compounds which decompose to the corresponding organic isocyanates in accordance with the process of the present invention can be represented by the following structure:

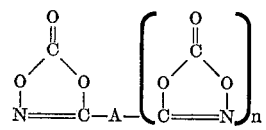

wherein $n$ has a value from 0 to 3 and A is hydrocarbon having up to about 50 carbon atoms. These A groups include aliphatic (including cycloaliphatic) hydrocarbons and aromatic hydrocarbons of 1 to 3 aromatic hydrocarbon rings. The hydrocarbon, A, in the above structure, can also be substituted with non-interfering groups, and can be mixed aliphatic-aromatic groups. Preferably, $n$ will have a value of 0 to 1.

Where A is aromatic hydrocarbon, it will often have 6 to about 20, preferably 6 to about 10, carbon atoms; also, at least one nitrile carbonate group will be attached to one of the aromatic ring carbon atoms of A. And where there are more than one nitrile carbonate groups and more than one aromatic rings in A, the nitrile carbonate groups may be attached to the same or different aromatic rings of A.

Where A is aliphatic hydrocarbon, it will preferably have 1 to about 30 carbon atoms and it can be saturated or unsaturated, straight or branched chain, or cycloaliphatic. Preferably it will be alkyl (including cycloalkyl) or, if unsaturated, contain only monoolefinic unsaturation (including cycloolefinic unsaturation). And where there are more than one nitrile carbonate groups they may be attached to the same or different carbon toms, but, preferably, a nitrile carbonate group will be attached to each end of the longest carbon-to-carbon chain in A. Aliphatic hydrocarbon A can also be further substituted with aromatic substituents.

According to the method of the present invention, conversion of the cyclic nitrile carbonate compounds to the corresponding organic isocyanates is effected by decomposing the cyclic nitrile compounds at elevated temperatures sufficient to cause such decomposition, either in the presence or absence of catalyst. Since elevated temperatures are employed the decomposition is a thermal reaction and suitable elevated temperatures are temperatures above that at which the carbonate decomposes to isocyanate but below temperatures which cause undue degradation of the desired isocyanate product in the reaction system employed. Degradation may be evidenced by conversion to organic by-products, and the extent of degradation at elevated temperatures can be a function of the time the product is held at such temperatures. Thus degradation can be a time-temperature relationship, the latter being controlled to prevent undue degradation of the desired product. Since the decomposition reaction is exothermic there may be a tendency for the reaction temperature to run away. Means for carrying away or absorbing heat may be used, therefore, to control the temperature below the degradation point of the desired isocyanate product.

The temperature employed will vary, of course, depending upon the decomposition temperature of the particular feed being used and degradation temperature of the particular isocyanate being prepared. Thus, for example, while decomposition temperatures as high as about 150°, 200° or even 325° C. or higher may be required in the case of some of the nitrile carbonates, the decomposition temperatures of others may range as low as 75° C. or even 50° C.

Advantageously, the decomposition is conducted in the presence of an inert solvent, i.e., chemically inert with respect to both the carbonate and isocyanate, such as benzene, xylenes, toluene, chlorobenzene, polyphenyl ethers, and the like, the solvent serving as a heat sink and preventing the formation of hot spots in the decomposition zone. Where relatively high decomposition temperatures are required, so that problem of product degradation are posed, isocyanate yields can be enhanced by removing the isocyanate product from the decomposition zone as soon as it is formed. This may be accomplished, for example, by conducting the decomposition at reduced pressures and in the presence of a high boiling, inert solvent and effecting flash vaporization and overhead collection of the isocyanate product. Such flash vaporization can be accomplished, for instance, by gradually adding the cyclic nitrile carbonate, preferably in admixture with, i.e. dissolved or dispersed in, an inert solvent, to the surface of a pool, or heel, of the high boiling solvent which is maintained in liquid phase and at decomposition temperatures. Continuous removal and collection of the flash vapors of isocyanate product can be by known methods and with known equipment.

The ability of the cyclic nitrile carbonate compounds of the invention to generate isocyanates upon heating provides an additional advantage to the consumer in that the cyclic compounds of the invention, in contrast to isocyanates, are stable in the absence of water and therefore can be easily handled and stored. Also, since there is no active hydrogen (e.g. in the form of HCl) present in the cyclic compounds used as feed in the method of the present invention, or in the decomposition products formed, to react with the isocyanate as the latter is made, use of the cyclic compounds for the production of isocyanates provides a method that does not suffer from the reduced yields and separation and purification problems presented by the by-products obtained from starting materials of commercial methods wherein active hydrogen is present. Use of these cyclic compounds in the preparation of isocyanates, furthermore, provides a process having advantages over commercial methods employing azides in that the former do not have the explosion tendencies of the latter and are more economical.

Useful starting materials for the process of the present invention include such aromatic poly(nitrile carbonates) as, for instance, the poly(nitrile carbonates) of benzene, toluene, naphthalene, anthracene, phenylbenzene, phenylnaphthalene, diphenylalkylenes such as diphenylmethylene, diphenylethylene (stilbene), dinaphthylalkylene and like aromatic hydrocarbons. Illustrative of such aromatic poly (nitrile carbonate) feeds are benzodi(nitrile carbonates), preferably those wherein the nitrile carbonate groups are in the non-ortho-position on the benzene ring, i.e., the meta and para positions, such as isophthalodi(nitrile carbonate) and terephthalodi(nitrile carbonate); benzotri(nitrile carbonates) such as 1,3,5-benzotri(nitrile carbonate); benzotetra(nitrile carbonates) such as pyromellitotetra(nitrile carbonate) and prehnitrotetra(nitrile carbonate); 2,4-di(nitrile carbonate)-m-xylene; 2,5-di(nitrile carbonate)-p-xylene; 1,4-di(nitrile carbonate)-o-xylene; 2,4-di(nitrile carbonate)-1-methyl-benzene; 2,4-di(nitrile carbonate)-1-ethylbenzene; 1,3,5-tri(nitrile carbonate)-2-ethylbenzene; 1,4-(nitrile carbonate)-2-nonylbenzene; 2,4-di(nitrile carbonate)-6-tricosylbenzene; 2,4-di(nitrile carbonate)-3-hexyl-benzene; 1,3,5-tri(nitrile carbonate)-6-hexacosylbenzene; 1,3-di(nitrile carbonate)-5-benzylbenzene; 1-[2,4-di(nitrile carbonate)]-2-phenyl propane; 2,8-di(nitrile carbonate) naphthalene; 1,3,5-tri(nitrile carbonate) naphthalene; 1,3-di(nitrile carbonate) tetrahydronaphthalene; 2,2-bis [p-di(nitrile carbonate) phenyl] propane; bis [p-di(nitrile carbonate) phenyl] methane; 1-chloro-3,5-di(nitrile carbonate) benzene; 4-bromo-1,3,5-tri(nitrile carbonate) benzene; 3-nitro-1,4-di(nitrile carbonate) benzene; 2,8-di(nitrile carbonate) anthracene; 2,5,8-tri(nitrile carbonate) anthracene, 4,4'-biphenyl di(nitrile carbonate); 2,2'-biphenyl di(nitrile carbonate); 4,4'-diphenylethane di(nitrile carbonate); 2,2'-diphenylethane di(nitrile carbonate); 4,4'-stilbene di(nitrile carbonate); and 2,2'-stilbene di(nitrile carbonate).

Similarly, the compounds which are useful in the process of the present invention also include aromatic mono (nitrile carbonates) such as, for instance, alkylated benzenes such as tolylnitrile carbonate, xylylnitrile carbonate, trimethylbenzonitrile carbonate, ethylbenzonitrile carbonate, hexylbenzonitrile carbonate, nonyl benzonitrile carbonate, dodecylbenzonitrile carbonate, pentadecylbenzonitrile carbonate and tricosylbenzonitrile carbonate; naphthomono(nitrile carbonates) such as 8- (or 1-) naphthonitrile, carbonate and 1-cyclohexyl-4-naphthonitrile carbonate and tetrahydronaphthonitrile carbonate; 1-chloro-4-benzonitrile carbonate; 4-bromo-1-benzonitrile carbonate; 3-nitrobenzonitrile carbonate; anthracene mono (nitrile carbonate); biphenyl mono(nitrile carbonates) such as 1-phenyl-4-benzonitrile carbonate, 1-benzyl-4-benzo-nitrile carbonate and 1-phenylethyl-4-benzonitrile carbonate; and the like.

Illustrative of suitable aliphatic poly(nitrile carbonate) feeds are malodi(nitrile carbonate); succinodi (notrile carbonate); glutarodi(nitrile carbonate); adipodi (nitrile carbonate); pimelodi(nitrile carbonate); suberodi (nitrile carbonate); azelodi(nitrile carbonate); sebacodi (nitrile carbonate); fumarodi(nitrile carbonate); itaconodi (nitrile carbonate); allylmalodi(nitrile carbonate); allylsuccinodi(nitrile carbonate); xerodi(nitrile carbonate); cetylmalodi(nitrile carbonate); thapsodi(nitrile carbonate); japanodi(nitrile carbonate); 1,6,9-decanetri(nitrile carbonate); 1,3,6-heptanetri(nitrile carbonate); cyclohexyldi (nitrile carbonate); 4-bromo-1,6-hexanedi(nitrile carbonate); 2 - chloro-1,9-nonanedi(nitrile carbonate); dilinoleodi(nitrile carbonate); trilinoleotri(nitrile carbonate); and the like.

Illustrative of suitable aliphatic mono(nitrile carbonate) feeds are methyl mono(nitrile carbonate); ethyl mono (nitrile carbonate); isopropyl mono(nitrile carbonate); butyl mono(nitrile carbonate); isobutyl mono(nitrile carbonate), pentyl mono(nitrile carbonate); cyclohexyl mono (nitrile carbonate); 3,5-dimethylhexyl mono(nitrile carbonate; 2-ethylbutyl mono(nitrile carbonate); decalin mono (nitrile carbonate); n-nonyl mono (nitrile carbonate; n-dodecyl mono(nitrile carbonate); 2-propyldodecyl mono(nitrile carbonate; n-heptadecyl mono(nitrile carbonate); stearyl mono(nitrile carbonate); tricosyl mono (nitrile carbonate); butenyl mono(nitrile carbonate); octenyl mono(nitrile carbonate); 2 - ethyloctenyl mono (nitrile carbonate); 3,5-dimethyldecenyl mono(nitrile carbonate; dodencyl mono (nitrile carbonate); oleyl mono (nitrile carbonate); cetene mono(nitrile carbonate); eicosene mono(nitrile carbonate); melene mono(nitrile carbonate); 4-chlorobutyl mono(nitrile carbonate); 8-nitrooctyl mono(nitrile carbonate); 1,3-butadiene mono(nitrile carbonate); isoprene mono(nitrile carbonate); cyclopentyl mono(nitrile carbonate); cyclodecyl mono (nitrile carbonate); cyclopentadecyl mono(nitrile carbonate); cycloheptadecyl mono(nitrile carbonate); cyclotetracosyl mono(nitrile carbonate); cyclo-octacosyl mono(nitrile carbonate); cyclotriacontyl mono(nitrile carbonate); 2-methylcycloheptyl mono(nitrile carbonate; 4-fluoro-cyclohexyl mono(nitrile carbonate); 2-ethoxy-cyclo-octyl mono (nitrile carbonate); 2-isopentoxy-cyclononyl mono (nitrile carbonate); 3-chloro-cyclodecyl mono (nitrile carbonate); α-decalyl mono(nitrile carbonate); β-decalyl mono(nitrile carbonate); 2-bromo-heptalen-1-yl-mono(nitrile carbonate); 2 - nitrotetral-1-yl-mono (nitrile carbonate); 4 - carene-mono(nitrile carbonate); 2 - perhydroanthracene-mono(nitrile-carbonate); 1,2-dimethyl-5-phenyl perhydrochrysen-3-yl-mono (nitrile carbonate); 2-perhydropentacene-mono(nitrile carbonate); and the like.

The cyclic nitrile carbonate compounds used in the process of the present invention can be prepared, for instance, by the methods described in copending applications Ser. No. 502,464, filed Oct. 22, 1965; Ser. No. 651,-380, filed July 6, 1967; Ser. No. 659,618, filed Aug. 10, 1967; and Ser. No. 671,932, filed Oct. 2, 1967; that is, the compounds can be prepared by reacting a hydroxamic acid and phosgene. Hydroxamic acids which react with phosgene to produce the cyclic nitrile carbonate compounds can be represented by the structure:

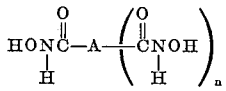

wherein A and $n$ are as defined above in the structure of the cyclic nitrile carbonate compound. Thus, the hydroxamic acid reactants include mono- as well as poly-, and aromatic as well as aliphatic hydroxamic acids. As specific examples may be mentioned those hydroxamic acids corresponding to the specific carbonate compounds set forth above, e.g., as listed in the parent applications of this application and in applications Ser. Nos. 651,380; 659,-618; and 671,932, mentioned supra and herein incorporated by reference. Included, then among the suitable hydroxamic acid starting materials are aromatic monohydroxamic acids such as hexylbenzohydroxamic acids; naphthohydroxamic acids; 1 - chloro-4-benzohydroxamic acid; 1-benzyl-4-benzohydroxamic acid; tricosylbenzohydroxamic acid and the like; aromatic polyhydroxamic acids such as 1,3,5-benzotrihydroxamic acid; isophthalodihydroxamic acid; 1-ethyl-2,4-benzodihydroxamic acid; 4-bromo-1,3,5 - benzotrihydroxamic acid; 2,8-anthracenedihydroxamic acid and the like; aliphatic monohydroxamic acids such as methylhydroxamic acid (also known as acetohydroxamic acid); cyclohexylhydroxamic acid; 2-ethylbutylhydroxamic acid; 4-chlorobutylhydroxamic acid; n-dodecenyl-11-hydroxamic acid; oleylhydroxamic acid and the like; and aliphatic polyhydroxamic acids such as malodihydroxamic acid; allylmalodihydroxamic acid; 1,6,9-decanetrihydroxamic acid; 2 - chloro-1,9-nonanedihydroxamic acid and the like.

Preparation of the hydroxamic acid starting materials can be by methods known in the art, such as, for instance, by the reaction of hydroxylamine with the corresponding carboxylic acid halides or with the lower alkyl esters of the corresponding carboxylic acids.

The temperature for effecting the reaction of the hydroxamic acid and phosgene may vary depending upon the particular hydroxamic acid selected but in all cases should be conducted below the decomposition temperature of the desired cyclic nitrile carbonate compound. Reflux temperatures can also be used as long as the reflux temperature of the particular mixture is below the decomposition temperature of the corresponding carbonate produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and super-atmospheric pressure can be employed, if desired.

Either the hydroxamic acid reactant or the phosgene reactant can be in excess but it is preferred that at least a stoichiometric amount of phosgene be used, that is, a ratio of at least one mole of phosgene per hydroxamic acid substituent. A large excess of phosgene is particularly preferred. The reaction can be conducted in the liquid phase and in many cases the hydroxamic acid will react from the solid state. Advantageously, the hydroxamic acid is first dissolved or slurried in an oxygen-containing organic solvent. Illustrative of suitable oxygen-containing solvents are the phosgene reactant itself and normally liquid organic ethers, esters, furans, dioxanes and the like. The preferred solvent is the phosgene reactant, an excess of which will partially dissolve the hydroxamic acid.

The reaction is often over in less than about 0.5 hour, for example, 15 minutes, or in about 5 to 20 hours, depending upon the reaction temperature employed, and is marked by a cessation in hydrogen chloride gas evolution. Normally at least about 0.5 hour is required for the reaction to go to completion at temperatures which minimize side reactions. The reaction is usually quite rapid as the hydroxamic acid is dissolved. At the lower reaction temperatures the hydroxamic acid is generally slow to dissolve and may even come out of solution, go back into solution, etc., during the reaction.

The cyclic nitrile carbonate compound can be recovered from the resulting solution by any desirable means—for instance, by first filtering the resulting solution to remove any unreacted starting materials and subjecting the filtrate to reduced pressure to remove unreacted phosgene and inert solvent, if employed, and provide the cyclic nitrile carbonate as a crude product. Alternatively, prior to the filtering step the solution can be cooled to crystallize out the product which is then recovered as described. The crude product, which can be either crystalline or liquid depending on the particular nitrile carbonate prepared, may contain small amounts of impurities which might be high in chlorine content. A purer product, essentially chlorine-free, can be obtained by recrystallization techniques as, for instance, from a suitable solvent such as dichloromethane, carbon disulfide, ethyl acetate, thionyl chloride and the like, or mixtures thereof.

A convenient alternative method for obtaining an essentially chlorine-free nitrile carbonate is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular nitrile carbonate feed selected. If desired, a combination of both the recrystallization and extraction methods can be used to obtain essentially chlorine-free nitrile carbonate. Decomposition of the essentially chlorine-free feed in accordance with the method of the present invention results in a purer isocyanate product, which is also essentially chlorine-free.

The following examples will serve to illustrate preparation of the aromatic poly(nitrile carbonate) feed of the present invention.

EXAMPLE I

Preparation of isophthalodi(nitrile carbonate)

To a 300 cc. fluted, round bottom pressure flask equipped with a reflux condenser attached to a CaCl$_2$ drying tube, is added 9.8 g. (0.050 mole) of isophthalodihydroxamic acid and 165 g. (1.68 moles) of phosgene. The reaction mixture is stirred mechanically and heated to a maximum temperature of 45° C. for one hour. The phosgene is then removed from the reaction mixture. There is obtained an isophthalodi(nitrile carbonate) product containing small amounts of impurities. Recrystallization from carbon disulfide gives chlorine-free isophthalodi(nitrile carbonate).

EXAMPLE II

Preparation of terephthalodi(nitrile carbonate)

To a 300 cc. fluted, round bottom pressure flask equipped with a reflux condenser attached to a CaCl$_2$ drying tube, is added 9.8 g. (0.050 mole) of a terephthalodihydroxamic acid and 121 g. (1.22 moles) of phosgene. The reaction mixture is stirred mechanically and heated to a maximum temperature of 45° C. for two hours. The phosgene is then removed from the reaction mixture. There is obtained a terephthalodi(nitrile carbonate) containing small amounts of impurities. Recrystallization from dichloromethane gives chlorine-free terephthalodi (nitrile carbonate).

EXAMPLE III

Preparation of terephthalodi(nitrile carbonate)

To a 100 cc. round bottom, 1-necked flask equipped with a Dry Ice reflux condenser attached to a CaCl$_2$ drying tube and a magnetic stirrer were added 50 ml. of phosgene and 1.0036 g. of terephthalodihydroxamic acid. The reaction was stirred for about two hours then the phosgene allowed to evaporate off. The crude residue (1.0883 g.) was extracted with hot benzene. The benzene solution on cooling yielded white crystals of terephthalodi(nitrile carbonate), decomp. point 187–190° C. Yield 8.7%.

The infrared spectrum (Nujol mull) of the recrystallized material showed a significant band at 6.19 microns, characteristic of a conjugated C=N stretching vibration and strong bands at 5.37 and 5.45 microns characteristic of cyclic nitrile carbonates.

EXAMPLE IV

Preparation of mixed iso- and terephthalodi-(nitrile carbonates)

Fifty grams of an 85:15 mixture of isophthalodi-hydroxamic acid and terephthalodihydroxamic acid is added to 298 g. of phosgene in a pressure flask at room temperature with mechanical stirring. The mixture is warmed to 44° C., the solid dissolves almost completely and vigorous gas evolution is noted. After one hour at 45° C. the phosgene is removed and a mixture of iso- and terephthalodi-(nitrile carbonates) is obtained.

The following examples are presented to illustrate the preparation of aromatic polyisocyanates in accordance with the method of the present invention.

EXAMPLE V

Preparation of m-phenylenediisocyanate

A solution of 145.5 grams (0.587 mole) of isophthalodi-(nitrile carbonate) in 805 grams of a liquid polyphenyl ether ("Monsanto OS–124") having a boiling point above 500° C., the solution being maintained at about 150° C., was added dropwise over a 45 minute period to a 2-liter flask kept under vacuum and containing 77 grams of the polyphenyl ether held at about 300° C. The temperature of the reaction was held at about 290–320° C. during the addition. The vacuum was held between about 10 and 60 mm. of Hg pressure and depended strongly upon the rate of addition of the carbonate solution. During the addition period 78.7 grams (representing a yield of about 84%) of m-phenylene-diisocyanate having a setting point of about 46.2° C. was collected overhead.

EXAMPLE VI

Preparation of p-phenylenediisocyanate

Decomposition in the manner described in Example V above of a sample of terephthalodi(nitrile carbonate) provides p-phenylenediisocyanate.

EXAMPLE VII

Preparation of mixed m- and p-phenylenediisocyanates

Decomposition in the manner described in Example V of a sample of mixed iso- and terephthalodi(nitrile carbonates) provides a mixed product of m- and p-phenylenediisocyanates.

The following examples will serve to illustrate preparation of the aromatic mono(nitrile carbonate) feed of the present invention.

EXAMPLE VIII

Preparation of benzo(nitrile carbonate)

To a 300 cc. fluted, round bottom flask equipped with a reflux condenser attached to a CaCl$_2$ drying tube, is added 12.9 g. (0.094 mole) of benzohydroxamic acid and 100 cc. anhydrous ether. To the rapidly stirred slurry is added 12.3 g. (0.12) mole) of phosgene dropwise. The reaction mixture is heated to 34° C. for one hour. The phosgene is then removed from the resulting mixture. There results a quantitative yield of crude benzonitrile carbonate which upon recrystallization from pentane gives chlorine-free benzonitrile carbonate.

EXAMPLE IX

Preparation of p-methoxybenzo(nitrile carbonate)

In accordance with the procedure of Example VIII, 50 g. (0.30 mole) of p-methoxybenzohydroxamic acid is treated with 372 g. (3.75 moles) of phosgene for one hour at 27° C. There results a quantitative yield of crude p-methoxybenzonitrile carbonate which upon trituration with an ether-pentane mixture gives a chlorine-free solid.

EXAMPLE X

Preparation of p-nitrobenzo(nitrile carbonate)

In a similar manner, 50.0 g. (0.274 mole) of p-nitrobenzohydroxamic acid is treated with 330 g. (3.33 moles) of phosgene for four hours at a maximum temperature of 35° C. There is obtained a quantitative yield of crude p-nitrobenzonitrile carbonate which upon trituration with pentane gives a chlorine-free white solid.

EXAMPLE XI

Preparation of m-nitrobenzo(nitrile carbonate)

In like fashion, 49.7 g. (0.273 mole) of m-nitrobenzohydroxamic acid is treated with 330 g. (3.33 moles) of phosgene for an hour and a quarter at a maximum temperature of 44° C. There is obtained a quantitative yield of crude m-nitrobenzonitrile carbonate which upon trituration with pentane gives a chlorine-free solid.

The following examples illustrate the preparation of aromatic monoisocyanates in accordance with the method of the present invention.

EXAMPLE XII

Preparation of phenylisocyanate

Decomposition in the manner described in Example V of a sample of benzo(nitrile carbonate) provides phenylisocyanate.

EXAMPLE XIII

Preparation of p-methoxyphenylisocyanate

Decomposition in the manner described in Example V of a sample of p-methoxybenzo(nitrile carbonate) provides p-methoxyphenylisocyanate.

EXAMPLE XIV

Preparation of p-nitrophenylisocyanate

Decomposition in the manner described in Example V of a sample of p-nitrobenzo(nitrile carbonate) provides p-nitrophenylisocyanate.

EXAMPLE XV

Preparation of m-nitrophenylisocyanate

Decomposition in the manner described in Example V of a sample of m-nitrobenzo(nitrile carbonate) provides m-nitrophenylisocyanate.

The following examples will serve to illustrate the preparation of aliphatic poly(nitrile carbonate) feed of the present invention.

EXAMPLE XVI

Preparation of adipodi(nitrile carbonate)

To a 500 cc. fluted, round bottom pressure flask equipped with a reflux condenser attached to a CaCl$_2$ drying tube, is added 23.8 g. (0.114 mole) of adipodihydroxamic acid and 495 g. (4.98 moles) of phosgene. The reaction mixture is stirred mechanically and heated to a maximum temperature of 55° C. for two hours. The phosgene is removed from the reaction mixture. There results a quantitative yield of crude adipodi(nitrile carbonate) which upon recrystallization from pentane gives chlorine-free adipodi(nitrile carbonate).

EXAMPLE XVII

Preparation of adipodi(nitrile carbonate)

To a 1 liter, fluted, round bottom flask, equipped with a reflux condenser attached to a $CaCl_2$ drying tube, were added 13.2 g. (0.075 mole) of adipodihydroxamic acid and 300 cc. of tetrahydrofuran. The mixture was stirred mechanically and heated to a maximum temperature of 41° C. for about three hours, during which time 121 g. (1.20 moles) of phosgene was introduced. The resulting solution was filtered and the solvents removed under reduced pressure. There was obtained a quantitative yield of crude adipodi(nitrile carbonate), M.P.: 61–62° C. Recrystallization from a mixture of ether and pentane gave white chlorinefree needles, M.P.: 62–63° C.

*Analysis.*—Calc. for $C_8H_8N_2O_6$ (percent): C, 42.12; H, 3.53; N, 12.28; O, 42.07. Found (percent): C, 42.33; H, 3.55.

The infrared spectrum ("Nujol" mull) of the recrystalized material was determined and showed a significant absorption peak at 6.12 microns, characteristic of conjugated C=N stretching vibrations, and a significant band in the 5.48 micron region, characteristic of cyclic carbonates.

EXAMPLE XVIII

Preparation of fumarodi(nitrile carbonate)

To a 300 cc. fluted, round bottom pressure flask equipped with a reflux condenser attached to a $CaCl_2$ drying tube, is added 4.2 g. (0.029 mole) of fumarodihydroxamic acid and 248 g. (2.51 moles) of phosgene. The reaction mixture is stirred mechanically and heated to reflux for half an hour. The phosgene is removed from the reaction mixture. There results a quantitative yield of crude fumarodi(nitrile carbonate) containing a small amount of impurities. Recrystallization from benzene gives chlorinefree fumarodi(nitrile carbonate).

EXAMPLE XIX

Preparation of fumarodi(nitrile carbonate)

To a 3-liter, fluted, round bottom flask equipped with a Dry Ice reflux condenser were added 182.6 g. (1.25 moles) of fumarodihydroxamic acid and 500 cc. of tetrahydrofuran. A two-fold excess of phosgene was fed into the reaction mixture over a period of about two hours and the temperature of the reaction was maintained at about room temperature. The reaction mixture was allowed to stand overnight, whereupon the product was separated from unreacted starting material. There resulted a 66.9% yield of recrystallized (from toluene) fumarodi(nitrile carbonate), M.P.: 163–165° C. Yield of product is based on reacted starting material.

The infrared spectrum ("Nujol" mull) of the product showed the typical nitrile carbonate absorptions. The product gave the following data upon analysis:

*Analysis.*—Calculated (percent): C, 36.38; H, 1.02; N, 14.14. Found (percent): C, 36.70, H, 1.42; N, 12.63.

EXAMPLE XX

Preparation of sebacodi(nitrile carbonate)

To a 300 cc. fluted, round bottom pressure flask equipped with a reflux condenser attached to a $CaCl_2$ drying tube, is added 28.0 g. (0.121 mole) of sebacodihydroxamic acid and 495 g. (5 moles) of phosgene. The reaction mixture is stirred mechanically and maintained at a maximum temperature of 25° C. for two hours. The phosgene is removed from the reaction mixture to give a quantitative yield of crude carbonate based on reacted starting material. The crude sebacodi(nitrile carbonate) is recrystallized from pentane to give chlorine-free sebacodi(nitrile carbonate).

EXAMPLE XXI

Preparation of sebacodi(nitrile carbonate)

To a 500 cc., fluted, round bottom flask, equipped with a reflux condenser attached to a $CaCl_2$ drying tube, was added 5.7 g. (0.025 mole) of sebacodihydroxamic acid and 175 cc. of benzene. The mixture was stirred mechanically and heated to a maximum temperature of 55–75° C., during which time 28 g. (0.28 mole) of phosgene was introduced. The resulting solution was filtered and the solvents removed under reduced pressure. There was obtained a quantitative yield of crude sebacodi(nitrile carbonate), M.P.: 42–45° C. Recrystallization from a mixture of ether and pentane gave white needles, M.P.: 44–45° C.

The infrared spectrum ("Nujol" mull) of the recrystallized sample was determined and showed a characteristic conjugated C=N band at 6.13 microns, and a significant peak at 5.48 microns, characteristic of cyclic carbonates.

The following examples illustrate the preparation of aliphatic polyisocyanates in accordance with the method of the present invention.

EXAMPLE XXII

Preparation of tetramethylenediisocyanate

Adipodi(nitrile carbonate) in the amount of 40.9 grams (0.179 mole) was dispersed in 247 grams of a liquid polyphenyl ether ("Monsanto OS–124") having a boiling point above 500° C. and the resulting mixture maintained at 70° C. The mixture was added dropwise over a period of about 1 to 1.5 hours to a flask kept under vacuum and containing 124 grams of the polyphenyl ether held at about 300° C. The temperature of the reaction was held at 260–310° C. during the addition. The vacuum was held between about 0.02 to 5 mm. of Hg pressure during the addition and depended strongly upon the rate of addition of the carbonate solution. During the addition period 21.9 grams (representing an 87% yield) of tetramethylenediisocyanate was collected overhead. The polyphenyl ether remained in the flask.

EXAMPLE XXIII

Preparation of trans-vinylenediisocyanate

Decomposition in the manner described in Example XXII above of a sample of fumarodi(nitrile carbonate) provides trans-vinylenediisocyanate.

EXAMPLE XXIV

Preparation of octamethylenediisocyanate

Decomposition in the manner described in Example XXII of a sample of sebacodi(nitrile carbonate) provides octamethylenediisocyanate.

The following examples will serve to illustrate the preparation of aliphatic mono(nitrile carbonate) feed of the present invention.

EXAMPLE XXV

Preparation of butylnitrile carbonate

To a 300 cc. fluted, round bottom pressure flask equipped with a reflux condenser attached to a $CaCl_2$ drying tube, are added 9.8 g. (0.084 mole) of butylhydroxamic acid and 165 g. (1.66 moles) of phosgene. The reaction mixture is stirred mechanically and heated to reflux for half an hour. The phosgene is removed from the reaction mixture. There is obtained butyl(nitrile carbonate) product containing small amounts of impurities. Recrystallization from carbon disulfide gives butylmono(nitrile carbonate).

EXAMPLE XXVI

Preparation of decalin nitrile carbonate

To a 300 cc. fluted, round bottom pressure flask equipped with a reflux condenser attached to a $CaCl_2$ drying tube, is added 9.8 g. (0.050 mole) of decalinhydroxamic acid and 121 g. (1.2 moles) of phosgene. The reaction mixture is stirred mechanically and heated to a reflux for two hours. The phosgene is removed from the reaction mixture. There is obtained decalin(nitrile carbonate) product containing small amounts of impurities. Recrystallization from dichloromethane gives chlorine-free Decalin mono(nitrile carbonate).

EXAMPLE XXVII

Preparation of ethyl nitrile carbonate

A 500 ml. Erlenmeyer flask equipped with magnetic stirrer and Dry Ice condenser containing 100 ml. of diethylether was charged with 14 g. (0.14 mole) of phosgene. This mixture was magnetically stirred and 3 g. (0.033 mole) of ethylhydroxamic acid was added in three portions. A reaction temperature of 30–40° C. was maintained for two hours. The resulting solution was filtered to remove unreacted material. After removing the excess phosgene and solvent under reduced pressure, 3.5 g. (90% yield) of crude, liquid, propionitrile carbonate was obtained. Distillation of this product at 45° C. (1 mm. Hg.) gave 3.1 g. (80% yield) of colorless ethyl nitrile carbonate with a refractive index of $n_D^{25}$ 1.4190. The I.R. absorption bands at 5.35 and 5.65μ are indicative of this type of compound.

The following example illustrate the preparation of aliphatic monoisocyanates in accordance with the method of the present invention.

EXAMPLE XXVIII

Preparation of ethylisocyanate

A mixture of 10.17 grams (0.0881 mole) of ethyl nitrile carbonate and 0.42 grams of imidazole (catalyst) was heated in a distillation flask at atmospheric pressure to 135–150° C. for bout 75 minutes. During the heating period there was collected overhead 3.44 grams (representing a yield of about 55%) of ethylisocyanate.

EXAMPLE XXIX

Preparation of butlylsocyanate

Decomposition in the manner described in Example XXVIII of a sample of butyl nitrile carbonate provides butylisocyanate.

EXAMPLE XXX

Preparation of Decalin isocyanate

Decomposition in the manner described in Example XXVIII of a sample of Decalin nitrile carbonate provides Decalin isocyanate.

It is claimed
1. A process for the production of organic isocyanates which comprises subjecting to elevated, decomposition temperatures a cyclic nitrile carbonate compound which is essentially free of chlorine-containing impurities and which has the structure:

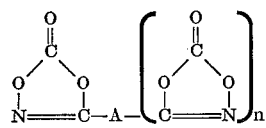

wherein $n$ has a value from 0 to 3 and A is hydrocarbon of up to about 30 carbon atoms.

2. The process of claim 1 wherein the cyclic nitrile carbonate compound is subjected to elevated, decomposition temperatures in a decomposition zone containing an organic solvent which is chemically inert with respect to the cyclic nitrile carbonate compound and the organic isocyanate product, said solvent being maintained in liquid phase and at a temperature above that at which the compound decomposes to said isocyanate product but below that at which substantial degradation of said isocyanate product results.

3. The process of claim 2 wherein A is aliphatic hydrocarbon of 1 to about 30 carbon atoms.

4. The process of claim 3 wherein A is alkyl or monoolefinic and $n$ has a value of 0.

5. The process of claim 4 wherein the cyclic nitrile carbonate compound is ethyl nitrile carbonate and the organic isocyanate product is ethylisocyanate.

6. The process of claim 2 wherein the conditions of temperature and pressure in the decomposition zone are so maintained as to effect flash vaporization of the organic isocyanate product as it is formed in the decomposition zone and said product is recovered by removing an overhead stream of product vapors from said decomposition zone.

7. The process of claim 6 wherein A is aliphatic hydrocarbon of 1 to about 30 carbon atoms.

8. The process of claim 7 wherein A is alkyl or monoolefinic and $n$ has a value of 1

9. The process of claim 8 wherein the cyclic nitrile carbonate compound is adipodi(nitrile carbonate) and the organic isocyanate product is tetramethylenediisocyanate.

10. The process of claim 6 wherein A is aromatic hydrocarbon of 1 to 3 aromatic rings and 6 to about 20 carbon atoms.

11. The process of claim 10 wherein A has 6 to about 10 carbon atoms.

12. The process of claim 10 wherein the cyclic nitrile carbonate compound has the structure:

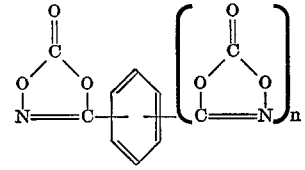

wherein $n$ has a value from 0 to 3

13. The process of claim 12 wherein $n$ has a value of 0.

14. The process of claim 10 wherein $n$ has a value of 1.

15. The process of claim 14 wherein the cyclic nitrile carbonate compound is isophthalodi(nitrile carbonate) and the organic isocyanate product is m-phenylenediisocyanate.

16. The process of claim 14 wherein the cyclic nitrile carbonate compound is terephthalodi(nitrile carbonate) and the organic isocyanate product is p-phenylenediisocyanate.

References Cited

UNITED STATES PATENTS 2,394,597  2/1946  Dickey et al. _____ 260—453

OTHER REFERENCES

Beck Berichte, vol. 84, pp. 688–9 (1951).

CHARLES B. PARKER, Primary Examiner

DOLPH H. TORRENCE, Assistant Examiner

U.S. Cl. X.R.

260—77.5, 307, 500.5; 117—139.5

UNITED STATES PATENT OFFICE
CERTIFICATE OF CORRECTION

Patent No. 3,507,900　　　　　　　　Dated April 21, 1970

Inventor(s) Emmett H. Burk, Jr. and Donald D. Carlos

It is certified that error appears in the above-identified patent and that said Letters Patent are hereby corrected as shown below:

Column 9, line 65
  Delete "300" and insert therefor --500--.

Claim 14, line 1 thereof, delete "10" and
  insert therefor --12--.

SIGNED AND SEALED
DEC 15 1970

(SEAL)
Attest:

Edward M. Fletcher, Jr.
Attesting Officer

WILLIAM E. SCHUYLER, JR.
Commissioner of Patents